(12) United States Patent
Iehara et al.

(10) Patent No.: US 10,670,410 B2
(45) Date of Patent: Jun. 2, 2020

(54) MAP CREATION SYSTEM AND MAP CREATING METHOD

(71) Applicant: MITSUBISHI HEAVY INDUSTRIES MECHATRONICS SYSTEMS, LTD., Kobe-shi, Hyogo (JP)

(72) Inventors: Masato Iehara, Tokyo (JP); Ryota Hiura, Tokyo (JP); Yoshihiro Mabuchi, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 214 days.

(21) Appl. No.: 15/119,510

(22) PCT Filed: Feb. 27, 2014

(86) PCT No.: PCT/JP2014/054954
§ 371 (c)(1),
(2) Date: Aug. 17, 2016

(87) PCT Pub. No.: WO2015/129002
PCT Pub. Date: Sep. 3, 2015

(65) Prior Publication Data
US 2017/0010103 A1 Jan. 12, 2017

(51) Int. Cl.
*G01C 21/32* (2006.01)
*G01C 21/34* (2006.01)
*G01C 21/36* (2006.01)

(52) U.S. Cl.
CPC ......... *G01C 21/32* (2013.01); *G01C 21/3461* (2013.01); *G01C 21/367* (2013.01)

(58) Field of Classification Search
CPC ... G01C 21/32; G01C 21/3461; G01C 21/367
(Continued)

(56) References Cited

U.S. PATENT DOCUMENTS 8,046,169 B2 * 10/2011 Mazlum ................. G01S 19/50
180/170
2010/0179755 A1 7/2010 Kohno et al.

FOREIGN PATENT DOCUMENTS

EP 1901260 A1 3/2008
JP H10-289396 A 10/1998
(Continued)

OTHER PUBLICATIONS

PCT/ISA/210, "International Search Report for International Application No. PCT/JP2014/054954," dated May 13, 2014.
(Continued)

*Primary Examiner* — Isaac G Smith
(74) *Attorney, Agent, or Firm* — Manabu Kanesaka

(57) ABSTRACT

An object of the present invention is to provide a map creation system and a map creating method capable of accurately creating road data on map data used for estimating a road being travelled by a vehicle. A map creation system includes a trajectory data creation unit creating trajectory data of a vehicle travelling in a predetermined area on a first road on the basis of positional information of the vehicle, a representative point extraction unit extracting, of created plural pieces of the trajectory data, representative points located on a side of a second road different from the first road, and a road data creation unit creating data for the first road on map data on the basis of the plural representative points extracted for respective plural predetermined areas.

8 Claims, 13 Drawing Sheets

(58) Field of Classification Search
USPC .......................................... 701/428, 411, 446
See application file for complete search history.

(56) References Cited

FOREIGN PATENT DOCUMENTS

| JP | H11-167343 | A |   | 6/1999 |
|----|------------|---|---|--------|
| JP | 11271075 | A | * | 10/1999 |
| JP | 2001-289653 | A |   | 10/2001 |
| JP | 2004-226341 | A |   | 8/2004 |
| JP | 2006-170970 | A |   | 6/2006 |
| JP | 2008-014666 | A |   | 1/2008 |
| JP | 4095456 | B2 |   | 3/2008 |
| JP | 2011-075474 | A |   | 4/2011 |
| JP | 2013-238544 | A |   | 11/2013 |
| JP | 2014-052341 | A |   | 3/2014 |
| JP | 2014052341 | A | * | 3/2014 |
| WO | 2007/007376 | A1 |   | 1/2007 |
| WO | 2008/035491 | A1 |   | 3/2008 |

OTHER PUBLICATIONS

PCT/ISA/237, "Written Opinion of the International Searching Authority for International Application No. PCT/JP2014/054954," dated May 13, 2014.
Japan Patent Office, "Office Action for Japanese Patent Application No. 2013-006513," dated Dec. 13, 2016.

* cited by examiner

MAP CREATION SYSTEM AND MAP CREATING METHOD

RELATED APPLICATIONS

The present application is National Phase of International Application No. PCT/JP2014/054954 filed Feb. 27, 2014, the disclosure of which is hereby incorporated by reference herein in its entirety.

TECHNICAL FIELD

The present invention relates to a map creation system and a map creating method creating a map used for a map matching process.

BACKGROUND ART

There has been known a technology in which an on-board unit mounted on a vehicle acquires a current position of the vehicle to estimate a road on which the vehicle is currently travelling on the basis of road information on map data stored in advance. The on-board unit, which is, for example, a car navigation apparatus, uses a GPS, a gyro, a vehicle speed sensor and the like to acquire the current position of the vehicle. For the map data, information stored in a storage medium is used.

As for the map data, viewability for a user when the map is displayed on a display device is prioritized. Accordingly, two or more roads actually overlapping each other in a height direction or two or more roads actually adjacent to each other are stored as the map data so as to have an interspace therebetween. This allows the user to easily recognize the map. However, there are some cases where the current position estimated by the on-board unit does not match the road information on the map data. Therefore, the map matching is performed in estimating the road on which the vehicle is currently travelling. The map matching is the technology for matching the current position of the vehicle with the road information on the map data.

For example, Patent Citation 1 has disclosed a technology in which with respect to a link, of roads in the map data, which has no width and is set at the center of the width of the road, a direction and a distance by which the link is displaced are calculated in accordance with a width of a road parallel to the road, or a positional relationship of both roads to set the link and the map matching threshold.

Patent Citation 1: Japanese Unexamined Patent Application, Publication No. 2008-14666 (paragraphs [0009], [0010], [0025], etc.)

SUMMARY OF INVENTION

Technical Problem

By the way, the actual roads include a toll road where fee-charging occurs due to a vehicle travelling, and a toll-free road where the fee-charging does not occur. Accordingly, the road information on the map data is made to have an attribute of a toll road or toll-free road. There has been proposed a road fee-charging system in which if a road being currently travelled which is estimated in the on-board unit is a toll road, a vehicle is charged for a fee.

The road fee-charging system is highly required to have no error in whether a fee is charged or an amount of a charged fee. However, the road information in the map data, which is stored at a position different from the actual road as described above, is not correct. For this reason, in a case, for example, of a toll road and a toll-free road parallel to each other, or branching off into a toll road and a toll-free road, the vehicle may be disadvantageously erroneously charged for a fee if determine to be travelling on the toll road in spite of being travelling on the toll-free road.

The present invention has been made in consideration such a circumstance, and has an object to provide a map creation system and a map creating method capable of accurately creating road data on map data used for estimating a road being travelled by a vehicle.

Solution to Problem

A map creation system according to a first aspect of the present invention includes a trajectory data creation unit creating trajectory data of a vehicle travelling in a predetermined area on a first road on the basis of positional information of the vehicle, a representative point extraction unit extracting, of created plural pieces of the trajectory data, representative points located on a side of a second road different from the first road, and a road data creation unit creating data for the first road on map data on the basis of the plural representative points extracted for respective plural predetermined areas.

According to this configuration, the data for the first road created on the map data is created on the basis a trajectory of the vehicle travelling on the first road. At this time, the representative point located on the side of the second road different from the first road is extracted for each of the plural predetermined areas on the first road, the extracted plural representative points are connected to each other or an approximate line is created to create the data for the first road. Then, in estimating a road being travelled by a vehicle (performing map matching) by use of the created data for the first road, if the vehicle is travelling on the first road, the vehicle is likely to be determined to be positioned on the data for the first road or on an opposite side of the second road side with respect to the data for the first road rather than to be determined to be positioned on the second road side with respect to the data for the first road. Therefore, an erroneous recognition can be reduced that the vehicle being travelling on the first road is determined to be positioned not on the first road but on the second road.

Here, the trajectory data is constituted by one or more pieces of positional information of the vehicle.

The above map creation system may extract the representative points on the basis of a frequency distribution of the plural pieces of trajectory data in the predetermined area.

According to this configuration, the position of the representative point extracted for each predetermined area is decided depending on a frequency of the plural pieces of trajectory data in the predetermined area. For example, in a case where the position of the representative point to be extracted is on the second road side, if a vehicle is travelling on the first road, it is possible to increase a probability that the vehicle is determined to be positioned on the first road and decrease a probability of being determined not to be positioned on the first road. On the other hand, the position of the representative point to be extracted is set to be farther from the second road than the side the closest to the second road, which makes it possible to decrease a probability of being determined to be positioned on the first road and increase a probability of being determined not to be positioned on the first road.

The above map creation system may extract the representative points on the basis of whether or not the vehicle travelling on the first road is charged for a fee and whether or not the vehicle travelling on the second road is charged for a fee.

According to this configuration, the position of the representative point extracted for each predetermined area is decided depending on whether or not the vehicle is charged for a fee due to travelling on the first road. For example, in a case where the position of the representative point to be extracted is set on the second road side, if a vehicle is travelling on the first road, a probability that the vehicle is determined to be positioned on the first road is increased. At this time, if the first road is a toll road and the vehicle travelling on the first road is charged for a fee, a fee-charging failure can be reduced. On the other hand, if the first road is a toll-free road, the vehicle travelling on the first road is not charged for a fee, and the vehicle travelling on the second road is charged for a fee, an erroneous fee-charging can be reduced.

In a case where the position of the representative point to be extracted is set to be farther from the second road than the side the closest to the second road, if a vehicle is travelling on the first road, a probability that the vehicle is determined to be positioned on the first road is decreased. At this time, if the vehicle travelling on the first road is charged for a fee, a probability of the fee-charging failure is raised. On the other hand, if the vehicle travelling on the first road is not charged for a fee and the vehicle travelling on the second road is charged for a fee, a probability of the erroneous fee-charging is raised.

In the above map creation system, the second road may be parallel to the first road or intersect with the first road.

A map creating method according to a second aspect of the present invention includes a step of creating trajectory data of a vehicle travelling in a predetermined area on a first road on the basis of positional information of the vehicle, a step of extracting, of created plural pieces of the trajectory data, representative points positioned on a side of a second road different from the first road, and a step of creating data for the first road on map data on the basis of the plural representative points extracted for respective plural predetermined areas.

Advantageous Effects of Invention

According to the present invention, it is possible to accurately create road data on map data used for estimating a road being travelled by a vehicle.

DESCRIPTION OF EMBODIMENTS

Figure 1:
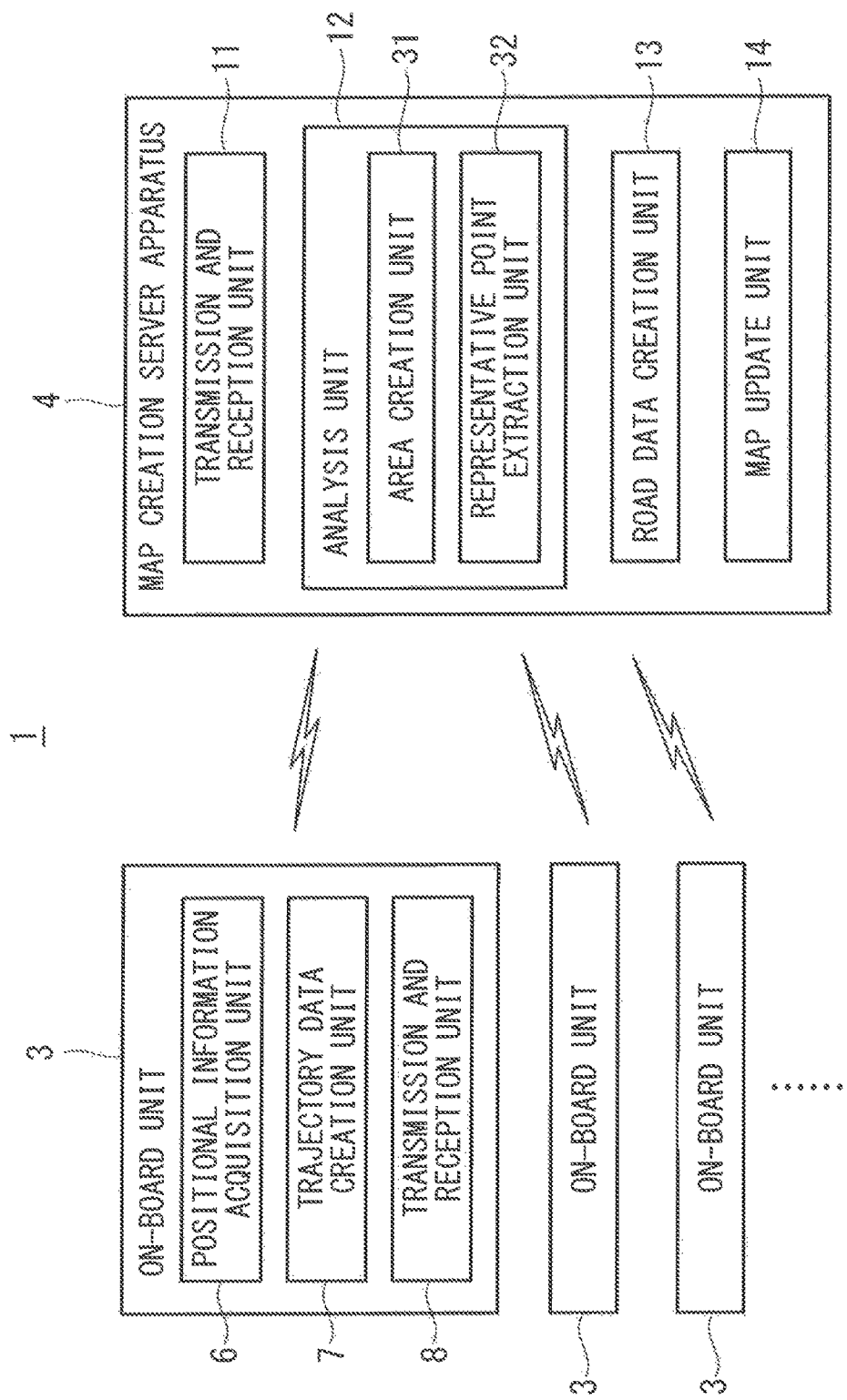
FIG. 1 is a block diagram showing a fee-charging map creation system according to an embodiment of the invention.

First, a description is given of a configuration of a fee-charging map creation system 1 according to an embodiment of the invention with reference to FIG. 1.

The fee-charging map creation system 1 creates a map suitable to a road fee-charging system 2. Here, the road fee-charging system 2 is a system for charging a vehicle being travelling on a toll road for a fee using an on-board unit 3 mounted on the vehicle. Since road data L on map data M stored in the on-board unit 3 is made to have an attribute of a toll road or toll-free road, if a road being currently travelled which is estimated in the on-board unit 3 is a toll road, the vehicle is subjected to a fee-charging process.

The fee-charging map creation system 1 accurately arranges on the map the toll road requiring fee-charging and the toll-free road not requiring fee-charging to create a fee-charging map which enables the road fee-charging system 2 described above to accurately acquire whether a fee is charged or an amount of a charged fee with respect to the vehicle.

The fee-charging map creation system 1 includes, for example, the on-board unit 3 mounted on the vehicle, and a map creation server apparatus 4 which is capable of transmitting and receiving data to and from the on-board unit 3 and creates the fee-charging map.

The on-board unit 3 includes, as shown in FIG. 1, a positional information acquisition unit 6 acquiring a position of the vehicle, a trajectory data creation unit 7 creating and storing trajectory data T on the basis of a temporal change of the position of the vehicle, a transmission and reception unit 8 transmitting the trajectory data T to the map creation server apparatus 4 or receiving the created or updated map data M from the map creation server apparatus 4, and the like.

Figure 6:
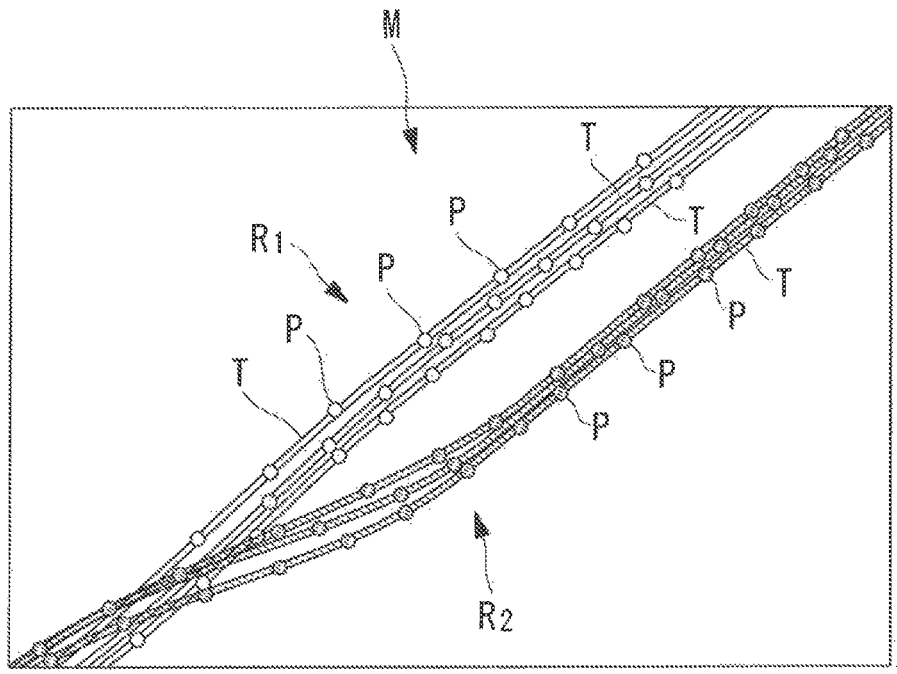
FIG. 6 is an illustration showing a map on the basis of map data.

The on-board unit 3 is a car navigation apparatus, for example, and the positional information acquisition unit 6 uses a GPS, a gyro, a vehicle speed sensor and the like to acquire a current position P of the vehicle (see FIG. 6). In FIG. 6, plotted are a plurality of current positions P acquired from a plurality of vehicles travelling on a road $R_1$ and a road $R_2$.

The trajectory data creation unit 7 creates, as shown in FIG. 6, the trajectory data T of the vehicle from a time series of a plurality of current positions P on the basis of identification information of the vehicle, the road data, positional information on the acquired plurality of current positions P of the vehicle, and the like, and stores the created trajectory data T in a storage medium.

The trajectory data T stored in the storage medium is transmitted to the map creation server apparatus 4 at a predefined timing, for example, at a certain time interval or depending on a travelling condition. The map data M created in the map creation server apparatus 4 is transmitted from the map creation server apparatus 4 to the on-board unit 3 depending on a travelling condition of the vehicle, a timing of update of the map data M, or the like.

The map creation server apparatus 4 includes, as shown in FIG. 1, a transmission and reception unit 11 receiving the trajectory data T from the on-board unit 3 or transmitting the created or updated map data M to the on-board unit 3, an analysis unit 12 deciding from plural pieces of trajectory data T a representative point $P_A$ required for creating the road data L, a road data creation unit 13 creating the road data L on the basis of the decided representative point $P_A$, a map update unit 14 updating the map data M by means of the created road data L, and the like.

Figure 7:
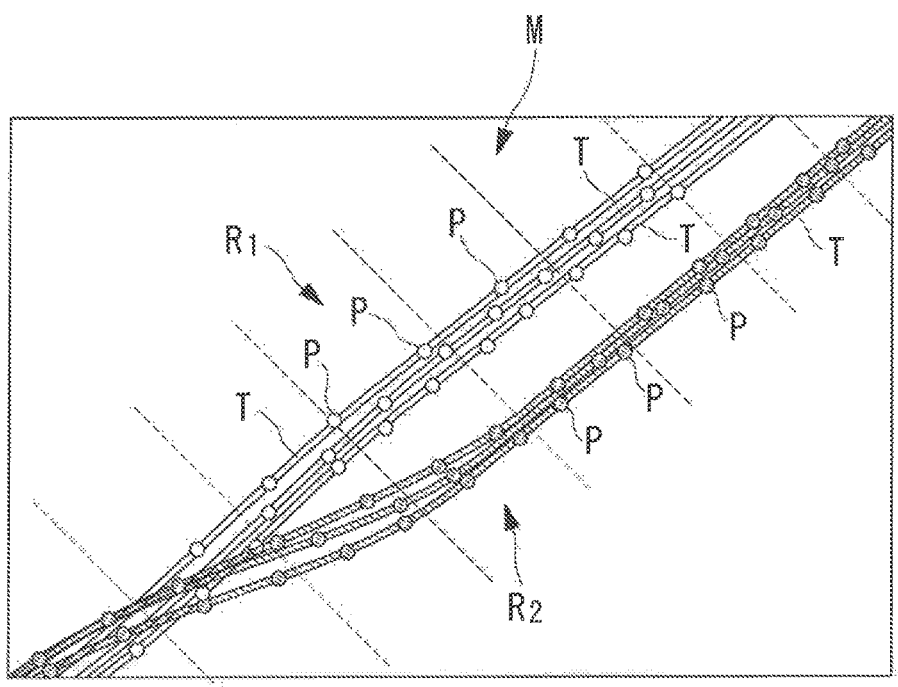
FIG. 7 is an illustration showing a map on the basis of the map data.

The analysis unit 12 includes, as shown in FIG. 7, an area creation unit 31 dividing target roads $R_1$ and $R_2$ to create a plurality of areas A, a representative point extraction unit 32 extracting the representative point $P_A$ on the basis of the trajectory data T acquired from a plurality of on-board units 3 in the area A, and the like.

The area creation unit 31 draws dividing lines D perpendicular to a travelling direction of a target road, for example, to create a plurality of areas A each of which is interposed between two dividing lines D along the travelling direction of the road.

Figure 8:
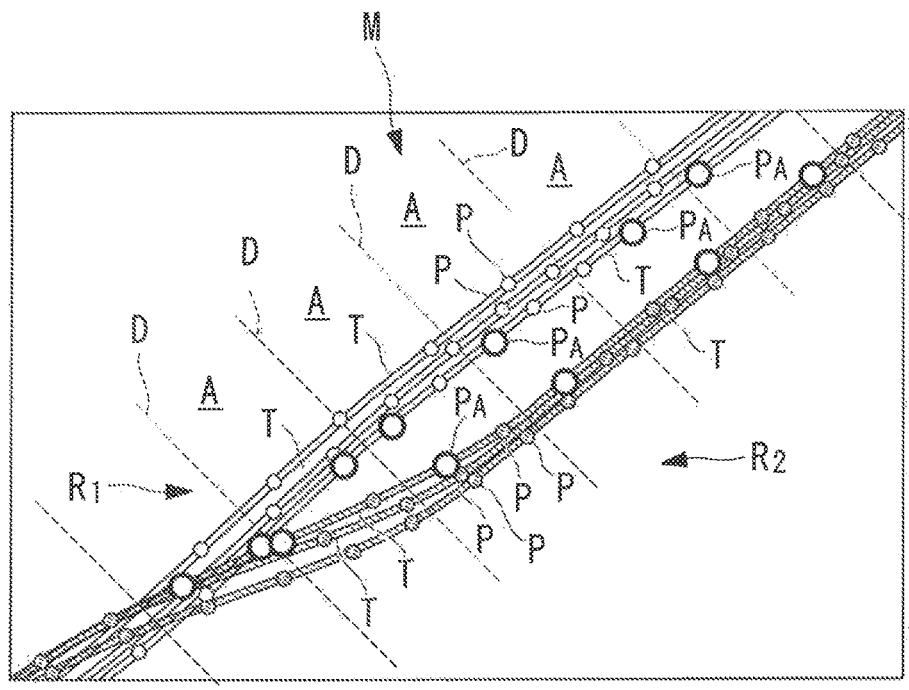
FIG. 8 is an illustration showing a map on the basis of the map data.

The representative point extraction unit 32 extracts the representative points $P_A$ in a plurality of areas A on the target road on the basis of a frequency distribution of the plural pieces of trajectory data T (see FIG. 8). The representative point extraction unit 32 extracts the representative points $P_A$ on the basis of fee-charging information concerning the target road and fee-charging information concerning a road parallel to or intersecting with the target road in a plurality of areas A on the target road.

Figure 9:
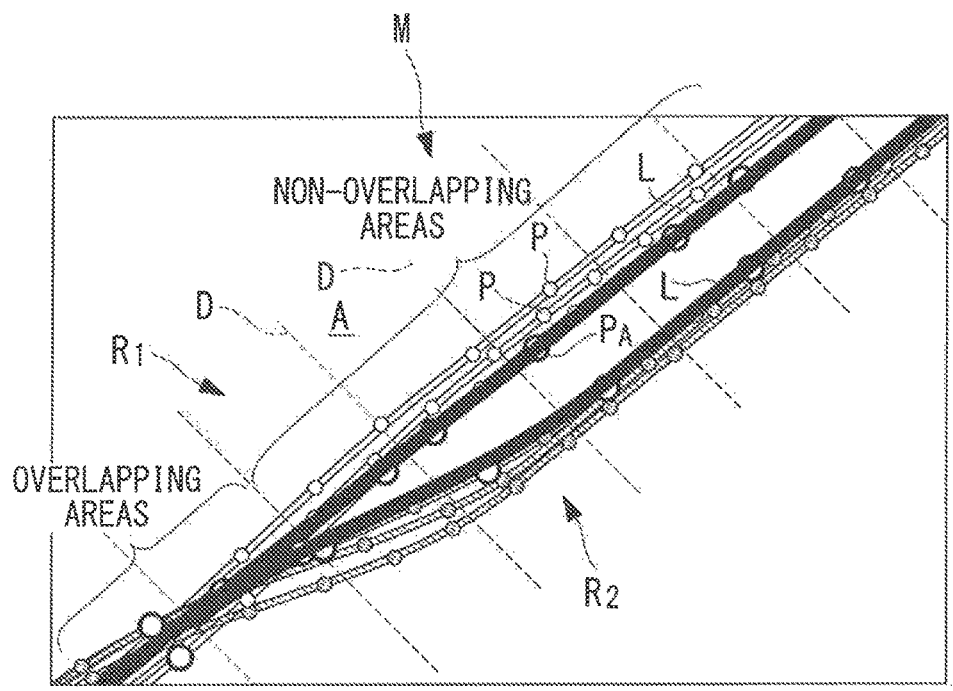
FIG. 9 is an illustration showing a map on the basis of the map data.

The road data creation unit 13 connects the extracted plural representative points $P_A$ or finds an approximate line thereof to create the road data L in a shape of straight line or curved line as shown in FIG. 9. The road data L created here which is the positional information concerning the road has no road width, and may be information concerning a line having no line width.

The map update unit 14 checks the created road data L such as by comparing with the road data L of the already created existing map data M, replaces the road data L, and creates new map data M if updating is determined to be required. Then, the map update unit 14 updates the map data M to be used for the road fee-charging system 2.

Figure 2:
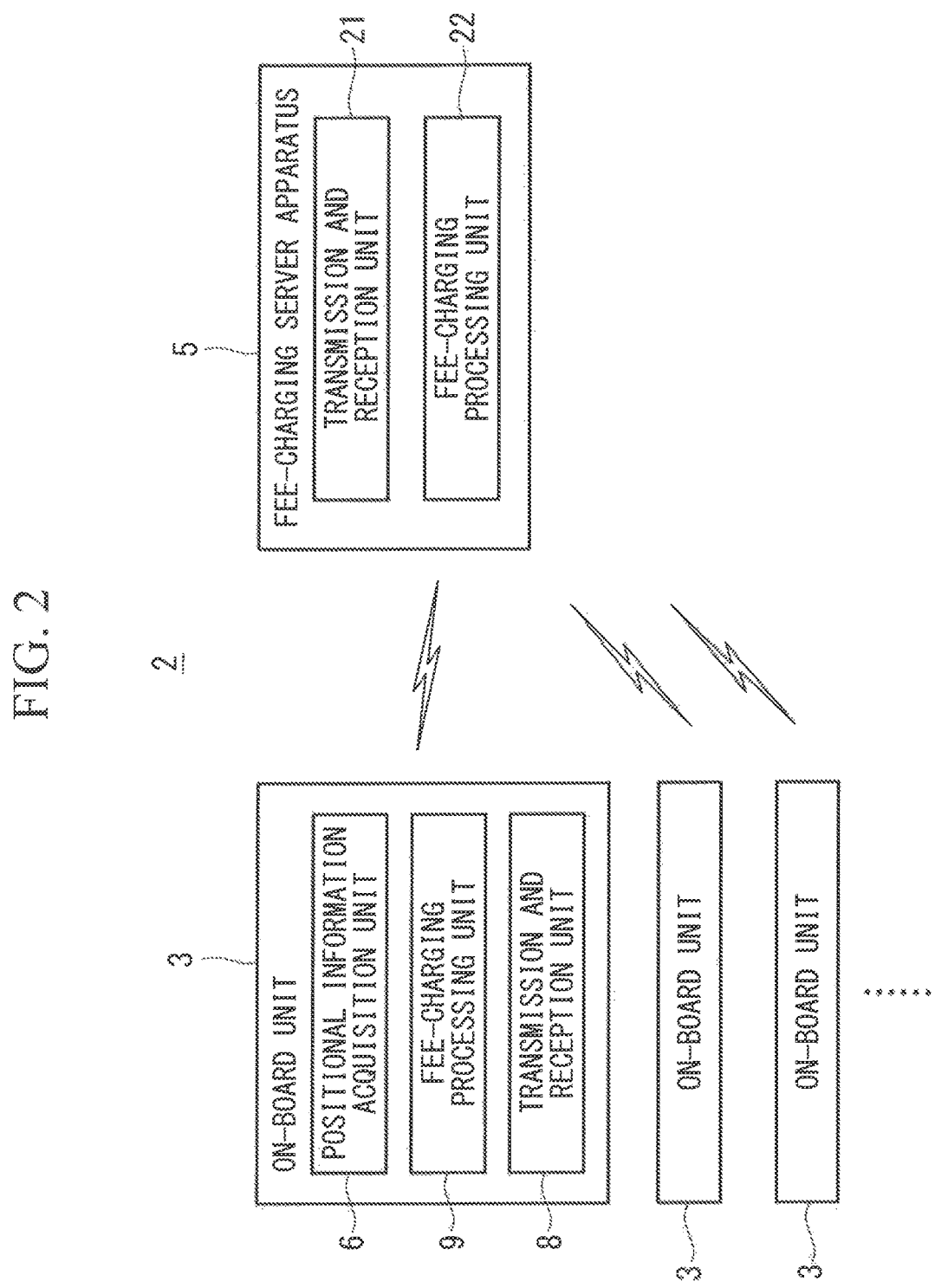
FIG. 2 is a block diagram showing a road fee-charging system according to an embodiment of the invention.

Next, a description is given of a configuration of the road fee-charging system 2 according to an embodiment of the invention with reference to FIG. 2.

The road fee-charging system 2 includes, for example, the on-board unit 3 mounted on the vehicle, and a fee-charging server apparatus 5 which is capable of transmitting and receiving data to and from the on-board unit 3 and subjects each vehicle to the fee-charging process.

The on-board unit 3 includes the positional information acquisition unit 6 described above, a fee-charging processing unit 9 determining whether a fee is charged, an amount of a charged fee or the like concerning the road on which the vehicle is travelling on the basis of the acquired current position of the vehicle and storing fee-charging data, a transmission and reception unit 8 performing transmission and reception concerning the fee-charging data to and from the fee-charging server apparatus 5, and the like.

The fee-charging server apparatus 5 includes a transmission and reception unit 21 performing transmission and reception concerning the fee-charging data to and from the on-board unit 3, a fee-charging processing unit 22 performing fee-charging process/management for each vehicle on the basis of the fee-charging data, and the like.

Figure 3:
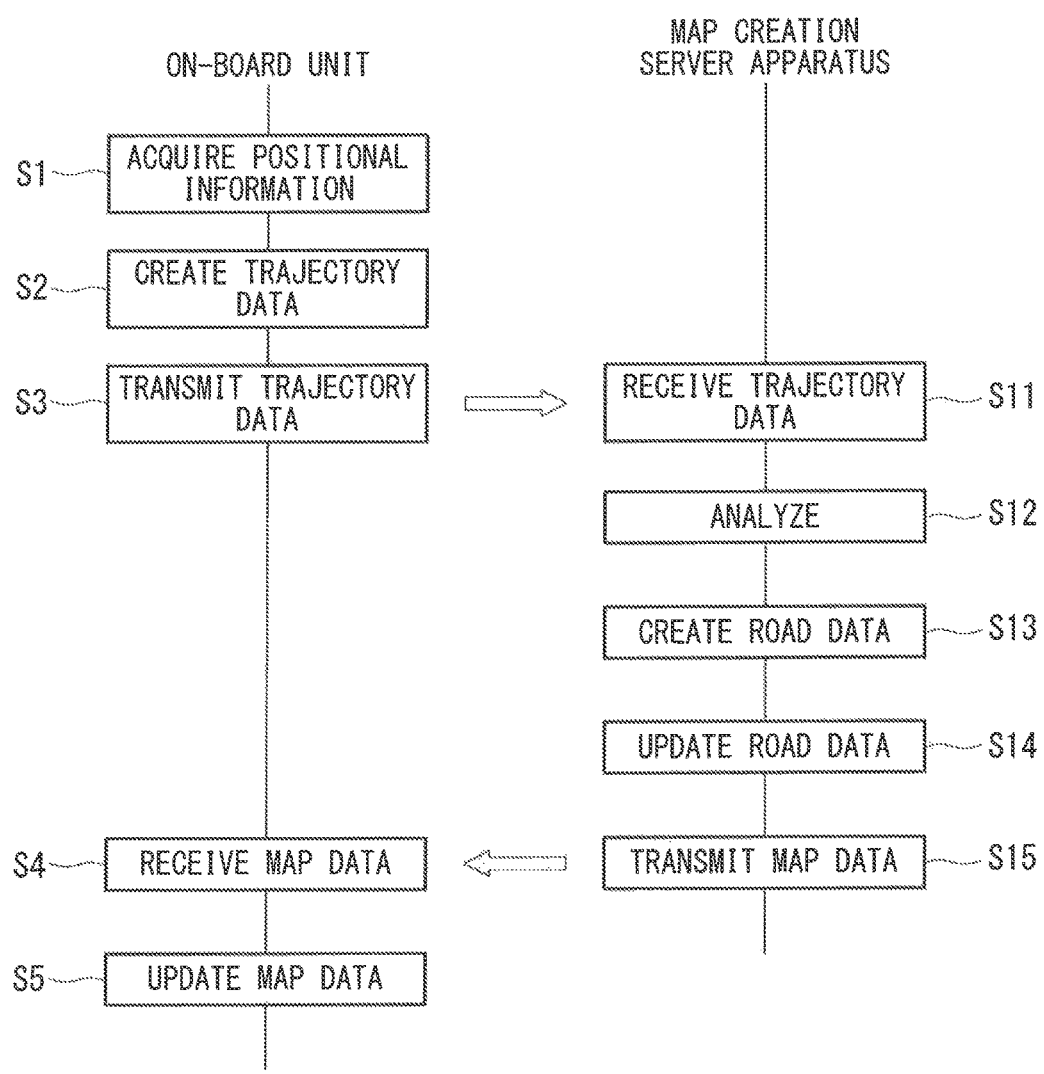
FIG. 3 is a flowchart showing an operation of the fee-charging map creation system according to an embodiment of the invention.

Next, a description is given of an operation of the fee-charging map creation system 1 with reference to FIG. 3.

First, the on-board unit 3 acquires the positional information on the current position P of the vehicle as the vehicle having the on-board unit 3 mounted thereon travels on the road (step S1). The positional information includes a latitude and longitude and data concerning the road being travelled, for example. The data concerning the road being travelled, if capable of being successively specified from the map data M on the basis of the latitude and longitude by the map matching process or the like, is acquired as the data concerning the road being travelled. On the other hand, the data concerning the road being travelled, if incapable of being successively specified from the map data M such as in a case of a plurality of candidates or the like, is specified at a post process by estimating from the trajectory data T including the prior and next current positions P.

If the on-board unit 3 acquires the plural pieces of positional information, it associates these with each other in time series to create the trajectory data T of the vehicle (step S2). The created trajectory data T is stored in the storage medium. Then, the trajectory data T is transmitted to the map creation server apparatus 4 at a predefined timing, for example, at a certain time interval or depending on a travelling condition (step S3).

Next, the map creation server apparatus 4 receives plural pieces of trajectory data T from a plurality of on-board units 3 (step S11). Analysis is performed from the plural pieces of trajectory data T (step S12) to create the road data L (step S13), and the map data M is updated by means of the created road data L (step S14). The representative point $P_A$ required for creating the road data L is extracted from the trajectory data T for each of the areas A, specifically described later. After that, the road data L is created on the basis of the decided representative points $P_A$ and the map data M is updated by means of the created road data L.

The map data M created in the map creation server apparatus 4 is transmitted from the map creation server apparatus 4 to the on-board unit 3 depending on a travelling condition of the vehicle, a timing of update of the map data M, or the like (step S15). After that, the on-board unit 3 receives the updated map data M (step S4) and updates the map data M stored in the on-board unit 3 (step S5).

Figure 4:
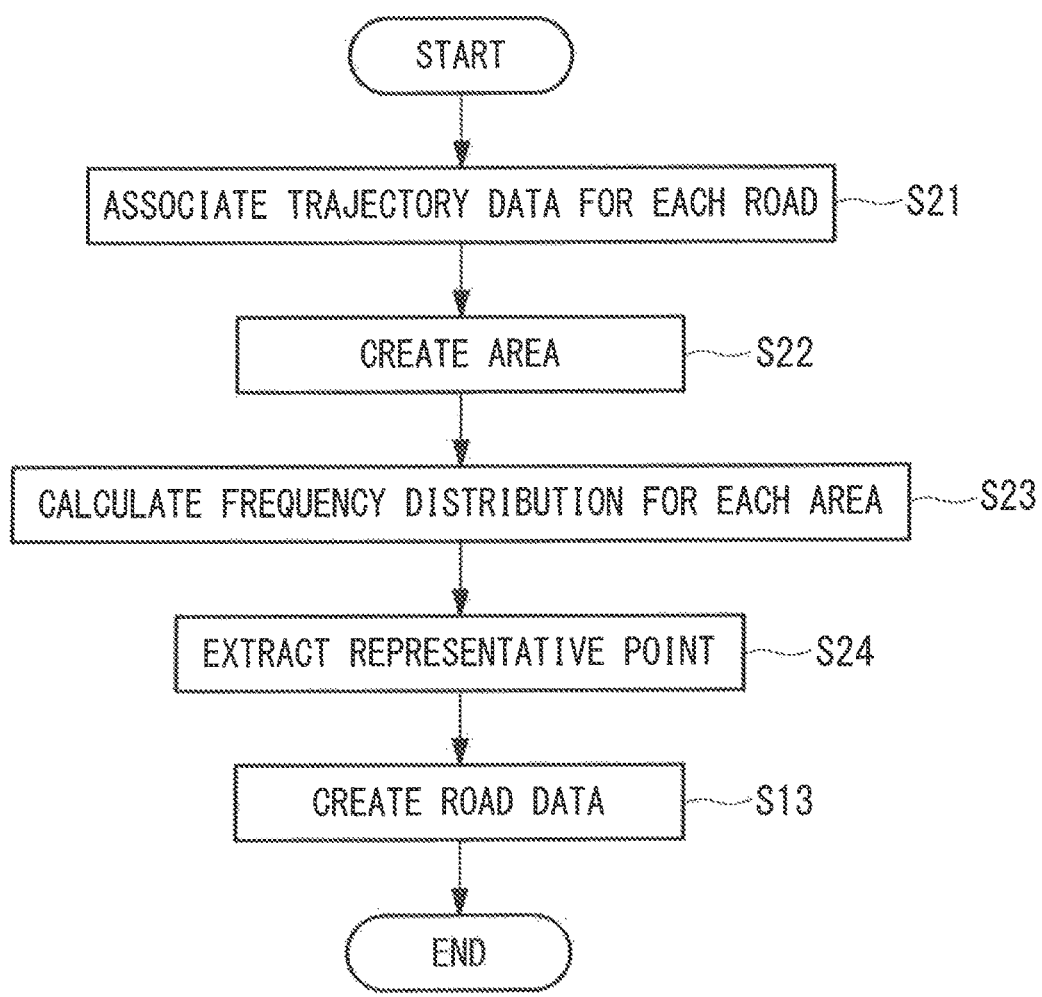
FIG. 4 is a flowchart showing a road data creation process of the fee-charging map creation system according to an embodiment of the invention.

Next, a description is given in detail of a road data creation process of the fee-charging map creation system 1 with reference to FIG. 4.

First, if the map creation server apparatus 4 receives plural pieces of trajectory data T from a plurality of on-board units 3, it associates the plural pieces of trajectory data T with each other for each road (step S21).

Additionally, a target road is divided to create a plurality of areas A (step S22). Specifically, as shown in FIG. 7, the dividing lines D are drawn perpendicular to the travelling direction of the target road to create a plurality of areas A each of which is interposed between two dividing lines D along the travelling direction of the road.

Then, a frequency distribution of the plural pieces of trajectory data T is found in a plurality of areas A on the target road (step S23). The frequency distribution is obtained by aggregating frequencies of the trajectory data T present in a width direction of the road.

For example, if the plural pieces of trajectory data T are obtained in the roads $R_1$ and $R_2$ as shown in FIG. 10(A), the frequencies of the trajectory data T present in the width direction of the road are aggregated to acquire the frequency distribution as shown in FIG. 10(B) for each of the roads $R_1$ and $R_2$. The frequency distribution is represented by a normal distribution in FIG. 10(B) for the purpose of illustration, but an aggregate result is not limited to the normal distribution. The frequency distribution may be aggregated so as to be represented by a histogram.

The positional information as a source of frequency calculation for the frequency distribution may be the positional information actually obtained in the on-board unit 3 or the positional information of intersecting points where the trajectory data T created by smoothly connecting the positional information to each other intersects with straight lines perpendicular to the travelling direction of the road.

Next, a description is given of a road data creating example using a plurality of Examples.

First, a description is given of a road data creating example as First Example in a case of two adjacent roads $R_1$ and $R_2$ which do not overlap each other. The case of two adjacent roads $R_1$ and $R_2$ which do not overlap each other refers to a case where the roads are arranged as shown by "non-overlapping areas" in FIG. 9, for example.

In this case, if the frequency distribution is found, the positional information located on the innermost side in the plural pieces of trajectory data T for each of the roads $R_1$ and $R_2$ is extracted as the representative point $P_A$ as shown in FIG. 10(C) (step S24). Then, the representative points $P_A$ are smoothly connected to each other to create the road data L as shown in FIG. 9 (step S13).

Figure 5:
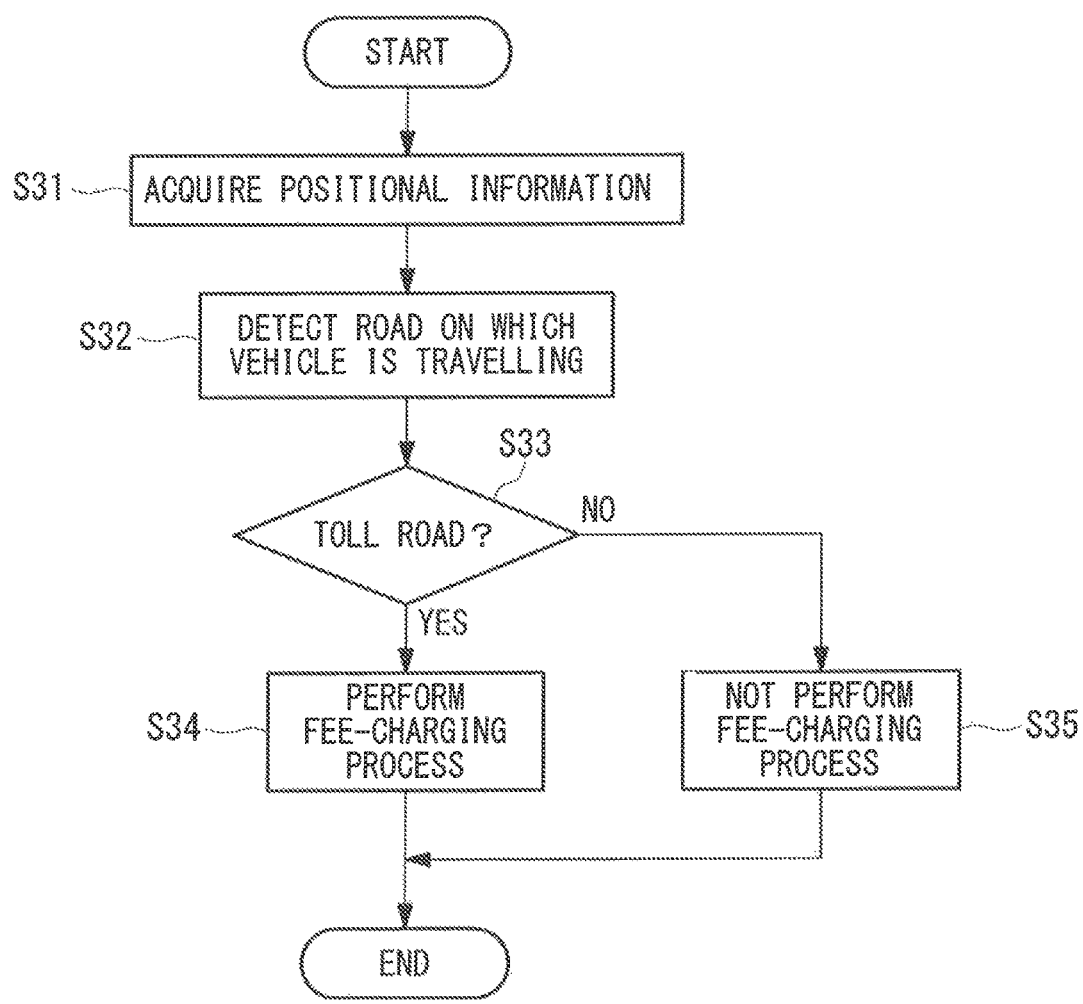
FIG. 5 is a flowchart showing a fee-charging process of the road fee-charging system according to an embodiment of the invention.

In a case where the road data L is created in this way, the road fee-charging system 2 performs the process as below. FIG. 5 is a flowchart showing the fee-charging process of the road fee-charging system according to the embodiment.

The positional information of the vehicle travelling on the road is acquired in real time (step S31), the road on which the vehicle is positioned, that is, the road being travelled by the vehicle is detected from the map data M on the basis of the acquired positional information (step S32). Specifically, the positional information of the vehicle acquired in real time is compared with the road information on the map data M to determine that the road the closest to the vehicle in distance is the road on which the vehicle is actually travelling.

Then, whether or not the road being travelled by the vehicle is a advantageous road requiring a fee-charging is determined (step S33). In a case of a toll road, the fee-charging process is performed in the on-board unit 3 (step S34), and in a case of a toll-free road not requiring a fee-charging, the fee-charging process is not performed (step S35).

Figure 10:
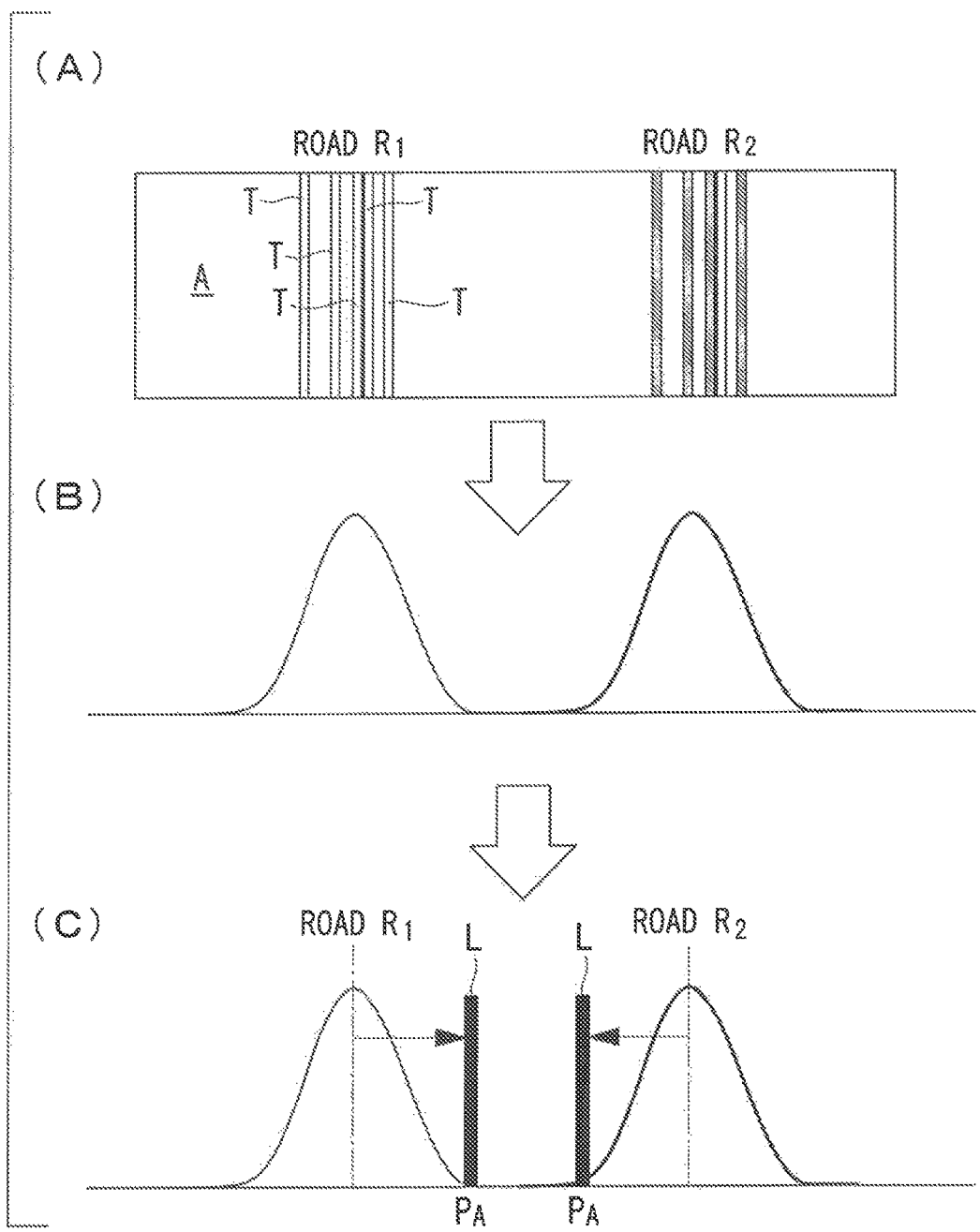
FIG. 10 is an illustration showing First Example of the road data creation process of the fee-charging map creation system according to an embodiment of the invention.

The fee-charging map creation system 1 extracts the positional information located on the innermost side as the representative point $P_A$ to create the road data L in the case of "non-overlapping areas" in FIG. 6 or in the case of two adjacent roads $R_1$ and $R_2$ which do not overlap each other as shown in FIG. 10. Therefore, the vehicle being travelling on either of two roads $R_1$ and $R_2$ travels less probably on the further inner side of relevant two adjacent roads $R_1$ and $R_2$. In other words, the vehicle more probably travels on an outer side of each of two adjacent roads $R_1$ and $R_2$ even in the case of either road $R_1$ or $R_2$. Therefore, in terms of a relationship between the positional information of the vehicle and the positional information of the road data, an erroneous recognition hardly occurs in estimating the road being travelled by the vehicle.

Moreover, the road data L is created on the basis of the representative point $P_A$ located on the innermost side where the vehicle probably travels as described above, which allows the road being travelled by the vehicle to be estimated without the erroneous recognition in terms of the relationship between the positional information of the vehicle and the positional information of the road data even if the road data L has no information concerning the road width.

Next, a description is given of a case as Second Example where a positioning result cannot be separated with enough accuracy such as an area close to a turnoff of two roads $R_1$ and $R_2$ and one is the toll road $R_1$ and the other is the toll-free road $R_2$. This case is, for example, a case of areas where the roads are arranged as shown by "overlapping areas" in FIG. 9, close to two roads $R_1$ and $R_2$ which start branching off.

Figure 11:
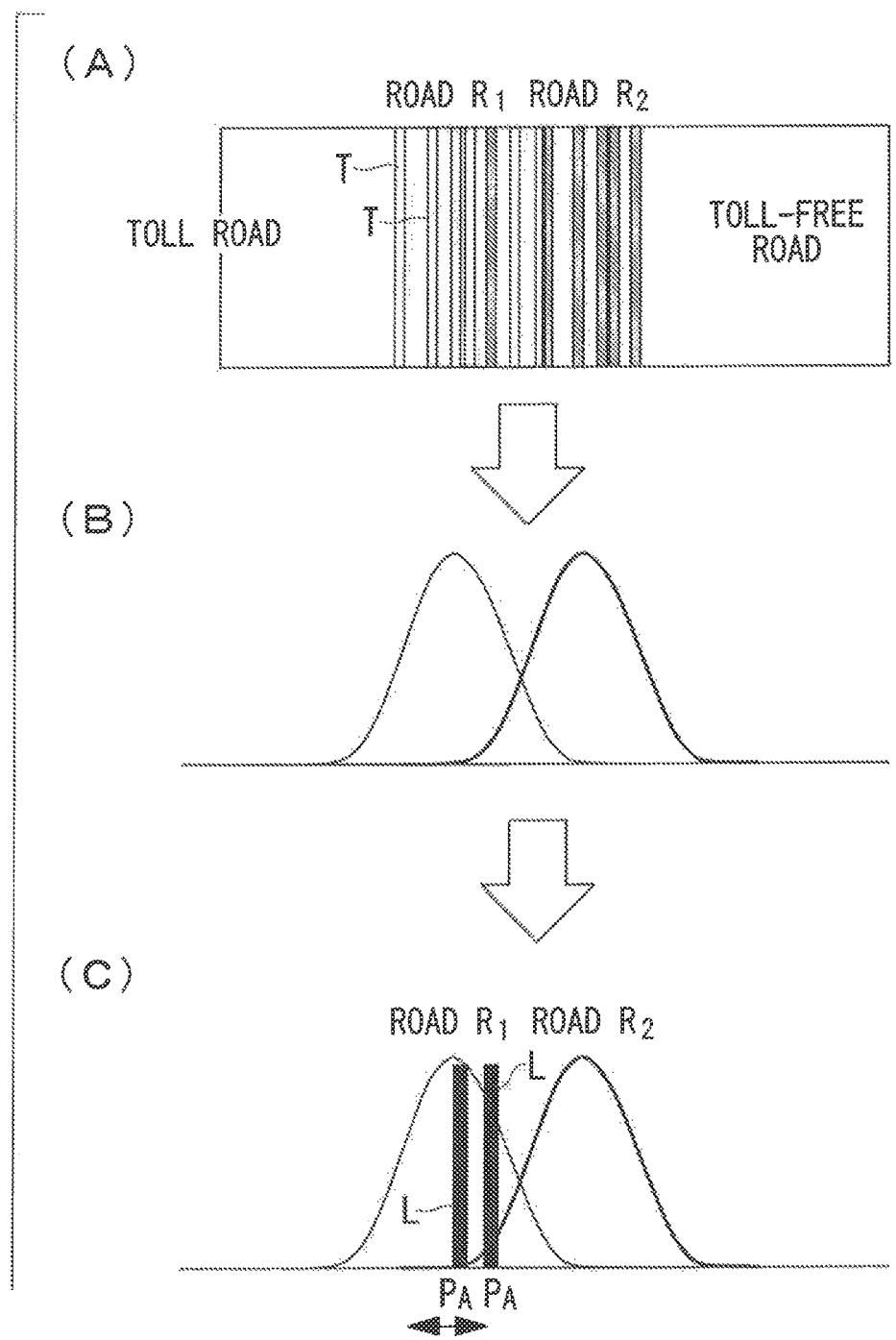
FIG. 11 is an illustration showing Second Example of the road data creation process of the fee-charging map creation system according to an embodiment of the invention.

In this case, for example, if the plural pieces of trajectory data T are obtained in the roads $R_1$ and $R_2$ as shown in FIG. 11(A), the frequencies of the trajectory data T present in the width direction of the road are aggregated to acquire the frequency distribution as shown in FIG. 11(B) for each of the roads $R_1$ and $R_2$.

In a case of the toll road $R_1$ and the toll-free road $R_2$ adjacent to each other which have the frequency distributions of the trajectory data T overlapping each other, if the frequency distributions are found, as for the toll-free road $R_2$, the positional information located the closest to the toll road $R_1$ side is extracted as the representative point $P_A$ as shown in FIG. 11(C) (step S24). The representative points $P_A$ are smoothly connected to each other to create the road data L for the toll-free road $R_2$ (step S13).

As for the toll road $R_1$, depending on a probability that the erroneous recognition may occur, that is, a probability that a fee-charging failure is permitted, the positional information corresponding to that probability is extracted as the representative point $P_A$ (step S24). The representative points $P_A$ are smoothly connected to each other to create the road data L for the toll road $R_1$ (step S13).

In a case where the road data L is created in this way, the road fee-charging system 2 performs the process as below.

The positional information of the vehicle travelling on the road is acquired in real time (step S31), the road on which the vehicle is positioned is detected from the map data M on the basis of the acquired positional information (step S32). Specifically, the positional information of the vehicle acquired in real time is compared with the road information on the map data to determine that the road the closest to the vehicle in distance is the road on which the vehicle is actually travelling.

Then, similarly to First Example, whether or not the road being travelled by the vehicle is a advantageous road requiring a fee-charging is determined (step S33). In a case of a toll road, the fee-charging process is performed in the on-board unit 3 (step S34), and in a case of a toll-free road not requiring a fee-charging, the fee-charging process is not performed (step S35).

In the fee-charging map creation system 1, in a case of the toll road $R_1$ and the toll-free road $R_2$ adjacent to each other which have the frequency distributions of the trajectory data overlapping each other, in creating the road data L for the toll-free road $R_2$, the positional information located the closest to the toll road $R_1$ side is extracted as the representative point $P_A$ at the time of creating the road data for the toll-free road $R_2$. Therefore, the vehicle being travelling on either of two roads $R_1$ and $R_2$ is more probably determined to be travelling on the toll-free road $R_2$ of the adjacent two roads $R_1$ and $R_2$.

As a result, an erroneous fee-charging can be reduced that the vehicle in an area close to a turn off of two roads $R_1$ and $R_2$ is charged for fee in spite of being travelling on the toll-free road $R_2$.

On the other hand, in creating the road data L for the toll road $R_1$, the positional information corresponding to the probability that the fee-charging failure is permitted is extracted as the representative point $P_A$ at the time of creating the road data for the toll road $R_1$. Therefore, with respect to the vehicle travelling on either of two roads $R_1$ and $R_2$, assuming the probability that the fee-charging failure is permitted is B %, a probability (A %) that the vehicle is determined to be travelling on the toll road $R_1$ of the adjacent two roads $R_1$ and $R_2$ is (100–B) %.

This point is further described with reference to FIG. 12.

Figure 12:
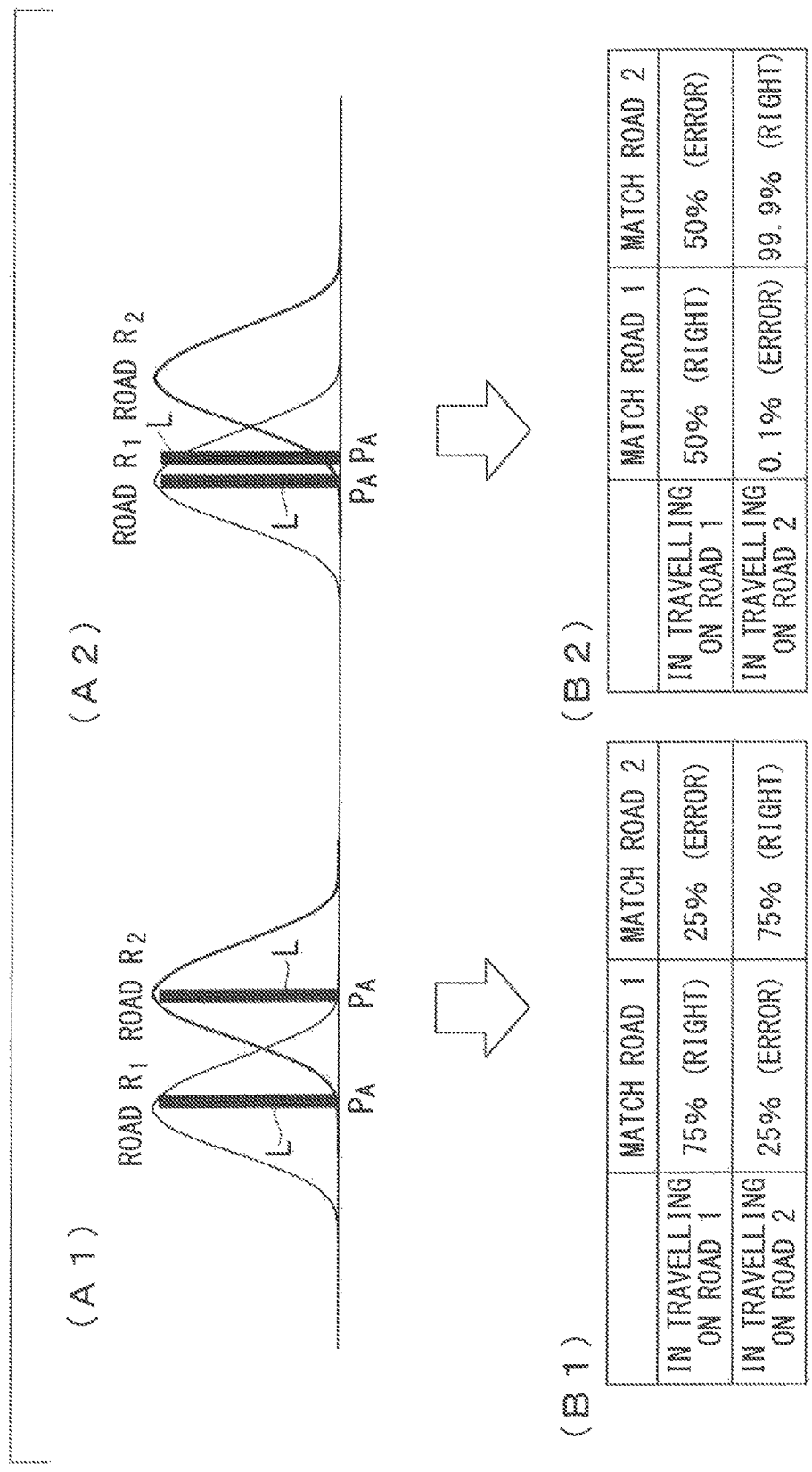
FIG. 12 is an illustration showing Second Example of the road data creation process of the fee-charging map creation system according to an embodiment of the invention.

For example, if the representative points $P_A$ of two roads $R_1$ and $R_2$ are defined to create the road data L as shown in FIG. 12(A1), a probability of matching with the road $R_1$ in travelling on the road $R_1$ is 75%, and a probability of matching with the road $R_2$ to make the erroneous recognition is 25% as shown in FIG. 12(B1). On the other hand, a probability of matching with the road $R_1$ in travelling on the road $R_2$ to make the erroneous recognition is 25%, and a probability of matching with the road $R_2$ is 75%. In other words, in the case where the road $R_2$ is a toll-free road, a probability of matching with the road $R_1$ to make the erroneous fee-charging is to be left at 25%.

In contrast to this, if the embodiment is applied such that the positional information located the closest to the toll road $R_1$ side is extracted as the representative point $P_A$ to create the road data L for the toll-free road $R_2$ as shown in FIG. 12(A2), a probability of matching with the road $R_1$ in travelling on the road $R_2$ to make the erroneous recognition is 0.1% and a probability of matching with the road $R_2$ is 99.9%. In other words, in the case where the road $R_2$ is a toll-free road, the probability of matching with the road $R_1$ to make the erroneous fee-charging is reduced to 0.1%.

In this way, the position of the representative point $P_A$ which is a reference for creating the road data L is adjust to allow the erroneous fee-charging to be reduced.

Here, if the toll-free road $R_2$ is set to a position where the erroneous fee-charging is allowed to be reduced, a probability of the erroneous recognition that the toll road $R_1$ is the toll-free road $R_2$ in travelling on the former to increase the fee-charging failure. Therefore, in the above description, in creating the road data L for the toll-free road $R_2$, the positional information located the closest to the toll road $R_1$ side is extracted as the representative point $P_A$ at the time of creating the road data for the toll-free road $R_2$, but the present invention is not limited to this example. The positional information extracted as the representative point $P_A$ may not be set to those the closest to the toll road $R_1$ side, but to slightly closer to the toll-free road $R_2$ than the closest to the toll road $R_1$ side, depending on a balance between occurrence of the erroneous fee-charging and occurrence of the fee-charging failure.

Next, with reference to FIG. 13 to FIG. 18, a description is given of a case as Third Example of a plurality of roads branching off substantially in a perpendicular direction not continuing substantially in parallel unlike in Second Example.

Figure 17:
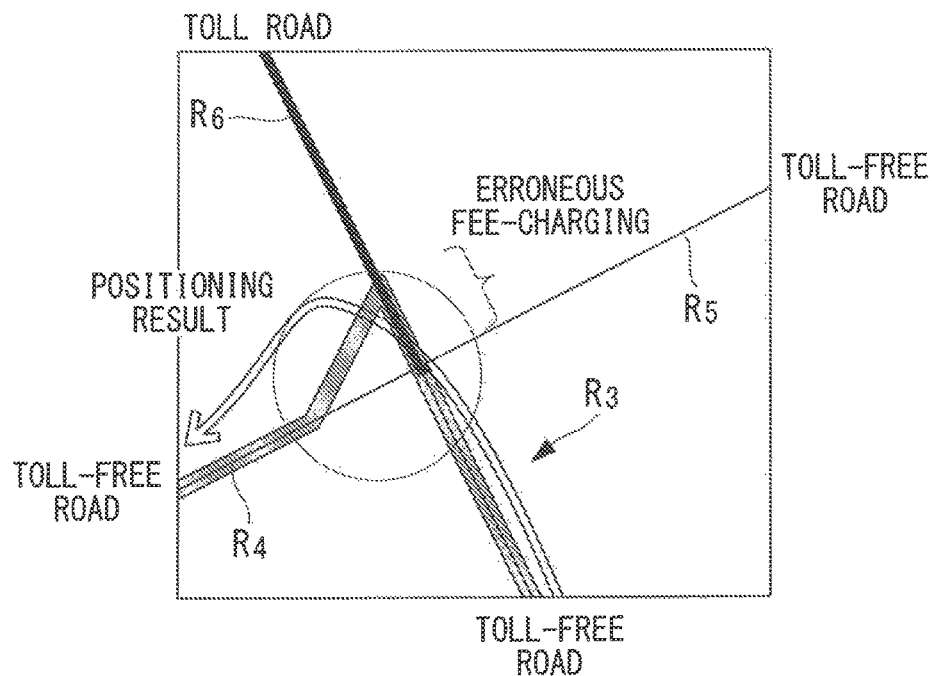
FIG. 17 is an illustration showing a fee-charging process of a road fee-charging system on the basis of map data of related art.

A description is given of a case where a positioning result cannot be separated with enough accuracy such as an area close to a turnoff, and a part of the roads is a toll road and the rest is a toll-free road. In the past, in the case where the erroneous recognition occurs in the map matching process, the toll road $R_6$ may have been recognized to be being travelled in spite of turning left from a toll-free road $R_3$ to a toll-free road $R_4$ as shown in FIG. 17. In this case, even if a change into that the toll-free road $R_4$ is being travelled could be made in a process after that, the fee-charging has occurred in a period while a part of the toll road $R_6$ was recognized to be being travelled.

A description is given of the road data creation process of the fee-charging map creation system 1 in Third Example.

Figure 13:
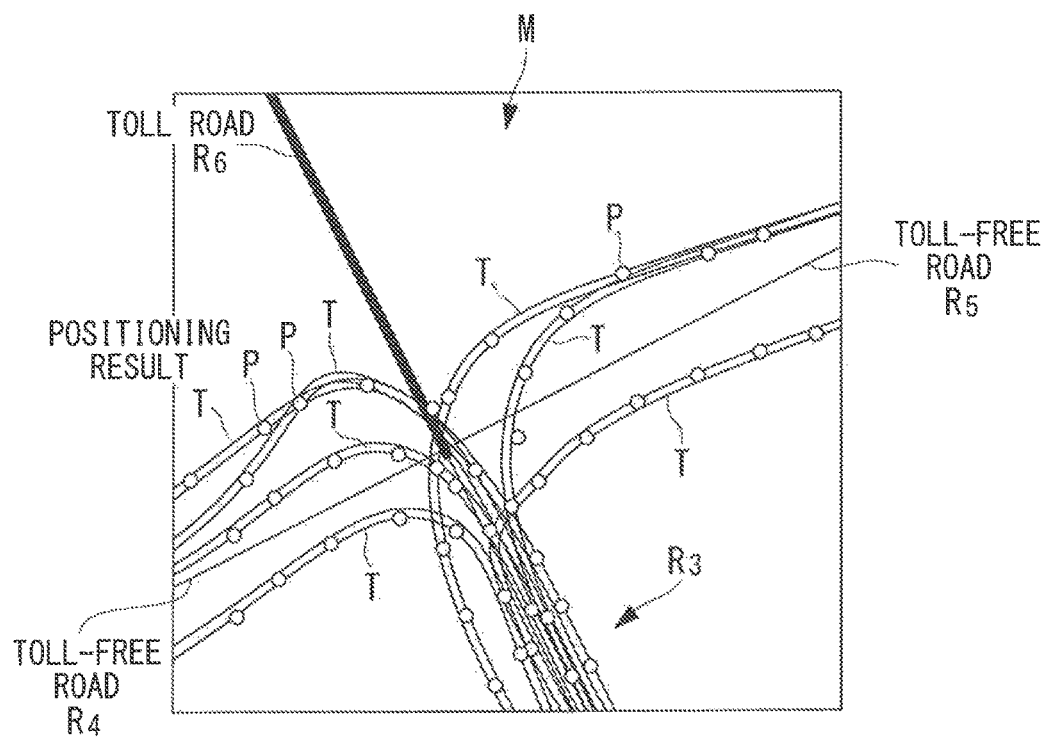
FIG. 13 is an illustration showing a map on the basis of the map data.

First, if the map creation server apparatus 4 receives plural pieces of trajectory data T from a plurality of on-board units 3, it associates the plural pieces of trajectory data T with each other for each road (step S21). FIG. 13 shows the trajectory data T on the map data M created from a plurality of current positions P.

Figure 14:
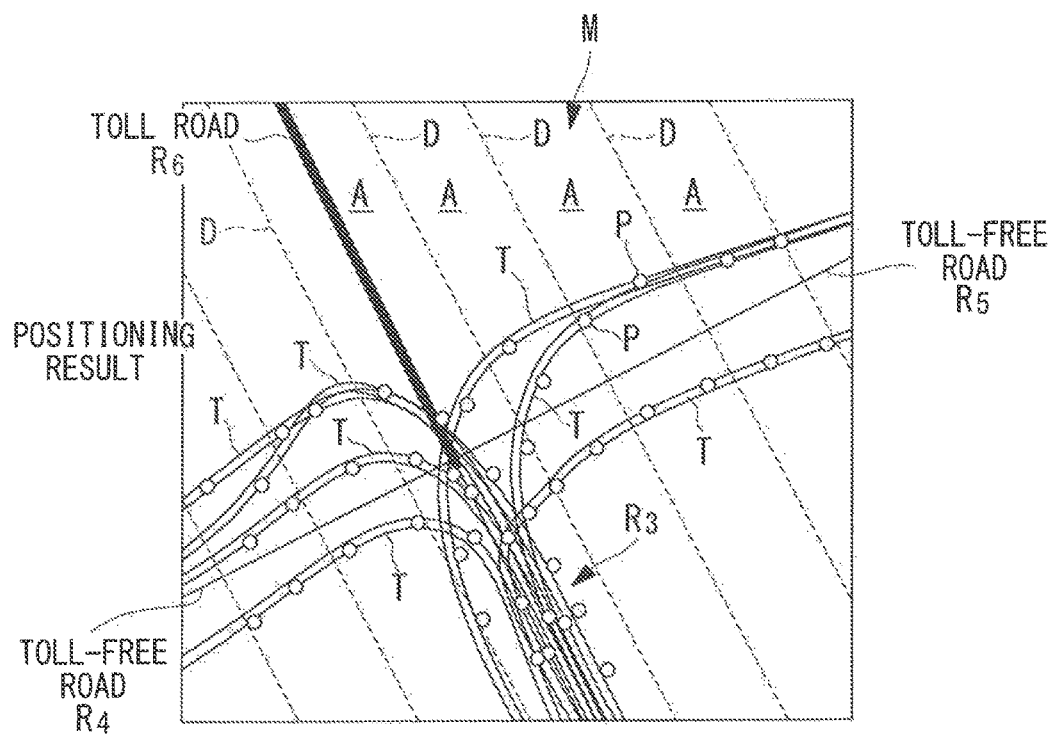
FIG. 14 is an illustration showing a map on the basis of the map data.

Toll-free roads $R_4$ and $R_5$ of target plural branched roads are divided to create a plurality of areas A (step S22). Specifically, as shown in FIG. 14, the dividing lines D are drawn perpendicular to the travelling direction of the target toll-free roads $R_4$ and $R_5$ to create a plurality of areas A each of which is interposed between two dividing lines D along the travelling direction of the toll-free roads $R_4$ and $R_5$.

Figure 15:
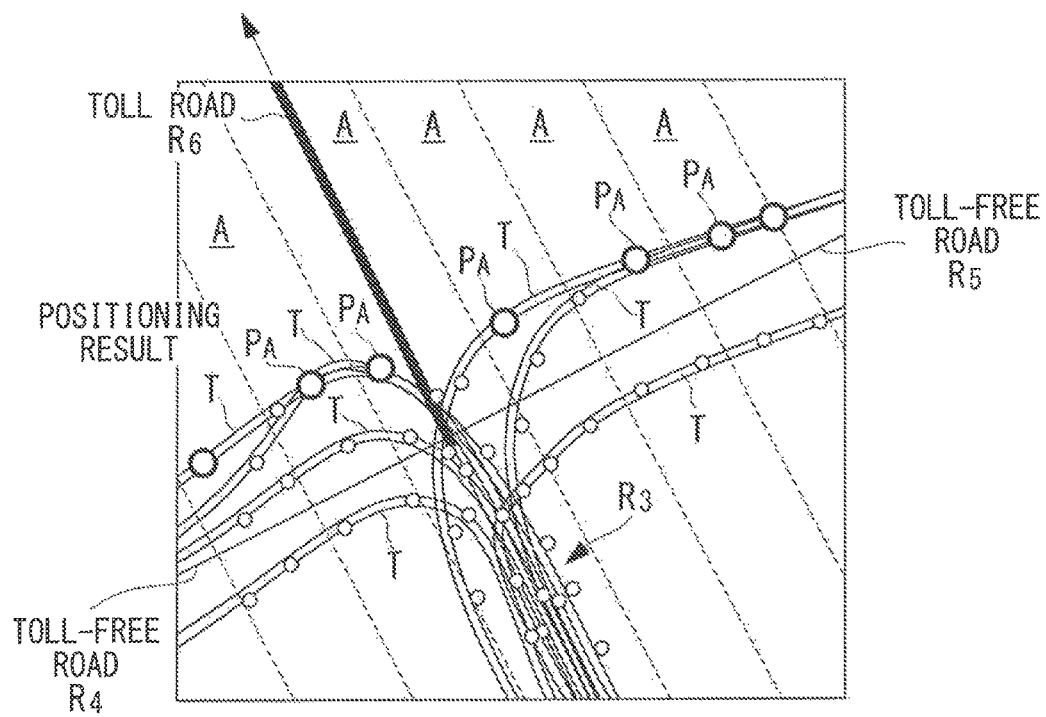
FIG. 15 is an illustration showing a map on the basis of the map data.
Figure 16:
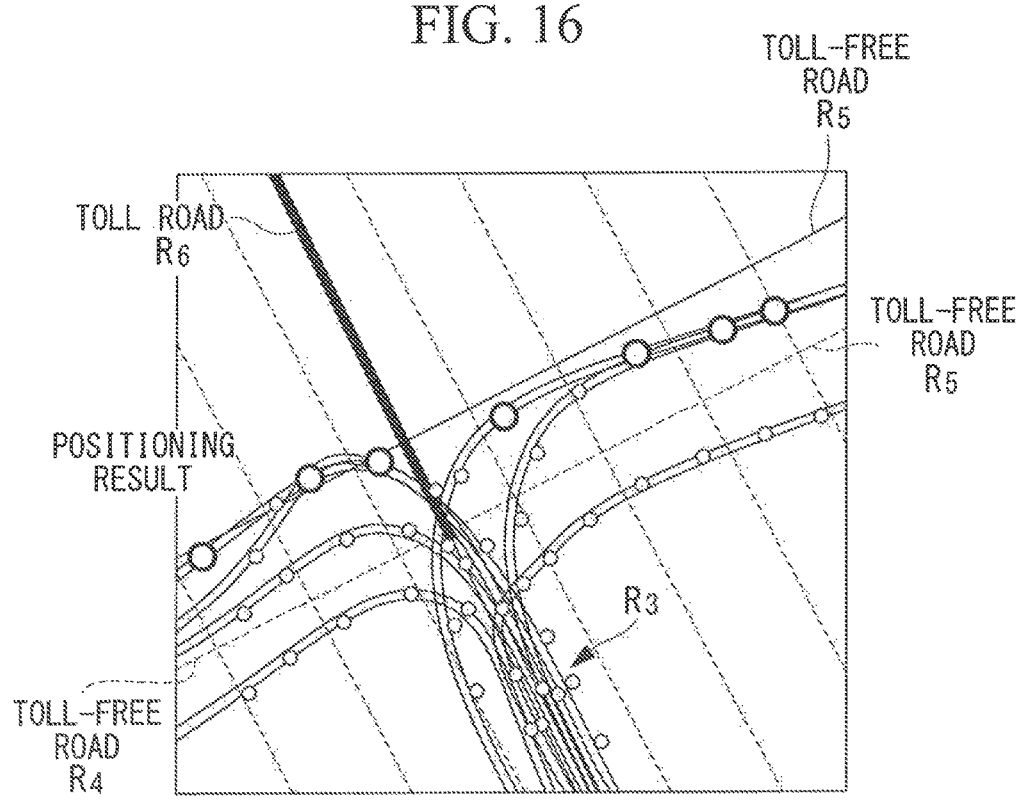
FIG. 16 is an illustration showing a map on the basis of the map data.
Figure 18:
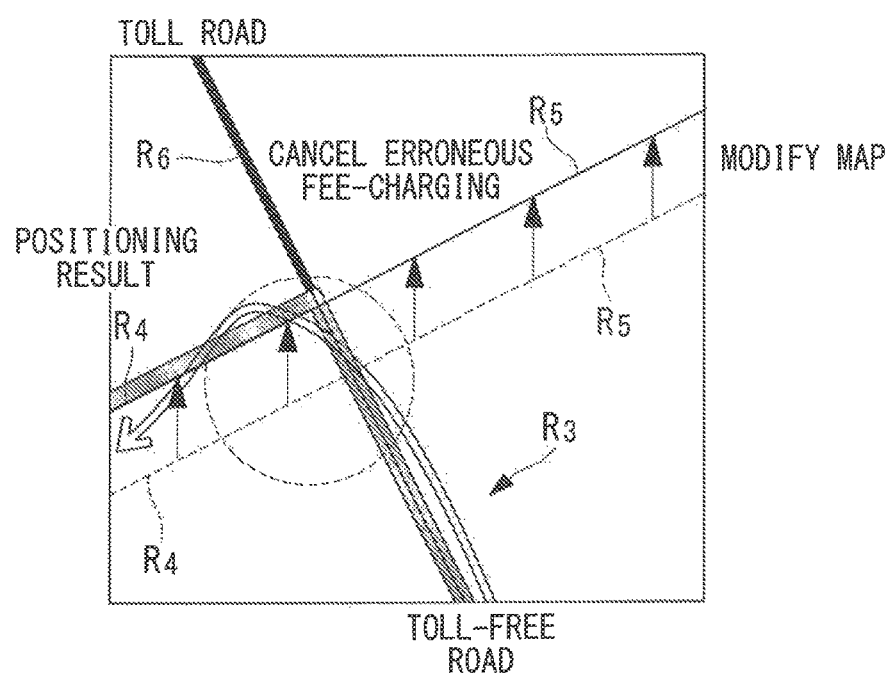
FIG. 18 is an illustration showing the fee-charging process of the road fee-charging system on the basis of the map data in accordance with Third Example of the road data creation process of the fee-charging map creation system according to an embodiment of the invention.

Then, a frequency distribution of plural pieces of trajectory data T is found in a plurality of areas A on the target toll-free roads $R_4$ and $R_5$. If the frequency distribution is found, as shown in FIG. 15, as for the toll-free road $R_4$ or $R_5$, the positional information located at a point the closest to a direction in which the toll road $R_6$ extends, that is, a point the farthest from the toll-free road $R_4$ or $R_5$ is extracted as the representative point $P_A$ (step S24). Then, as shown in FIG. 16, the representative points $P_A$ are smoothly connected to each other to create the road data L for the toll-free roads $R_4$ and $R_5$ (step S13). As a result, positions of the toll-free roads $R_4$ and $R_5$ are arranged at positions deviated from the original positions as shown in FIG. 18, for example.

The road fee-charging system 2 performs the processes in Third Example also similarly to in Second Example.

The positional information of the vehicle travelling on the road is acquired in real time (step S31), the road on which the vehicle is positioned is detected from the map data M on the basis of the acquired positional information (step S32). Specifically, the positional information of the vehicle acquired in real time is compared with the road information on the map data to determine that the road the closest to the vehicle in distance is the road on which the vehicle is actually travelling.

Then, whether or not the road being travelled by the vehicle is a advantageous road requiring a fee-charging is determined (step S33). In a case of a toll road, the fee-charging process is performed in the on-board unit 3 (step S34), and in a case of a toll-free road not requiring a fee-charging, the fee-charging process is not performed (step S35).

In the fee-charging map creation system 1, in a case of the toll road $R_6$ and the toll-free roads $R_4$ and $R_5$ intersecting with each other which have the frequency distributions of the trajectory data T overlapping each other, the positional information located at a point the closest to the direction in which the toll road $R_6$ extends is extracted as the representative point $P_A$ to create the road data L for the toll-free roads $R_4$ and $R_5$. Therefore, the vehicle unclear in which of the toll road $R_6$ and the toll-free roads $R_4$ and $R_5$ it is travelling on is more probably determined to be travelling on the toll-free road $R_4$ or $R_5$ of the intersecting roads.

As a result, an erroneous fee-charging can be reduced that the vehicle in an area close to a turn off is charged for fee in spite of being travelling on the toll-free road $R_4$ or $R_5$.

As described above, according to the embodiments, it is possible to accurately create the road data on the map data used for estimating the road being travelled by the vehicle. Additionally, the erroneous recognition can be reduced that the vehicle being travelling on one road of a plurality of roads is determined to be positioned not on relevant one road but on another road.

Note that the above embodiments describe the example in which the on-board unit 3 creates the trajectory data on the basis of the positional information of the vehicle and the trajectory data created by the on-board unit 3 is transmitted from the on-board unit 3 to the map creation server apparatus 4, but the present invention is not limited to this example. For example, the on-board unit 3 may transmit the positional information of the vehicle to the map creation server apparatus 4 and the map creation server apparatus 4 may create the trajectory data on the basis of the received positional information of the vehicle.

REFERENCE SIGNS LIST

1: Fee-charging map creation system
2: Road fee-charging system
3: On-board unit
4: Map creation server apparatus
5: Fee-charging server apparatus
6: Positional information acquisition unit
7: Trajectory data creation unit
8: Transmission and reception unit
9: Fee-charging processing unit
11: Transmission and reception unit
12: Analysis unit
13: Road data creation unit
14: Map update unit
21: Transmission and reception unit
22: Fee-charging processing unit
31: Area creation unit
32: Representative point extraction unit

The invention claimed is:

1. A map creation system comprising:
an on-board unit which includes a positional information acquisition unit acquiring positional information of a vehicle by means of a GPS, a gyro, or a vehicle speed sensor, and a trajectory data creation unit creating the trajectory data of the vehicle travelling in a predetermined area on a first road on a basis of the positional information of the vehicle acquired by the positional information acquisition unit; and
a map creation server apparatus which includes a transmission and reception unit receiving trajectory data configured to be transmitted from the on-board unit, wherein
the first road is a toll-free road where the vehicle travelling is not charged for a fee or a toll road where the vehicle travelling is charged for a fee,
a second road is a toll road where the vehicle travelling is charged for a higher fee than the first road,
the map creation server apparatus comprises:
a representative point extraction unit extracting plural pieces of the trajectory data for the first road created by the trajectory data creation unit, and representative points of the first road located on a side of the second road;
a road data creation unit creating road data for the first road on map data by connecting the plural representative points of the first road or by finding an approximate line of the plural representative points of the first road, the plural representative points being extracted by the representative point extraction unit for respective plural predetermined areas; and
a map update unit checking the road data newly created by the road data creation unit by comparison with the road data already existing, and replacing the existing road data with the newly created road data if updating is determined to be required.

2. The map creation system according to claim 1, wherein the representative point extraction unit extracts the representative points on a basis of a frequency distribution of the plural pieces of trajectory data in a predetermined area.

3. The map creation system according to claim 1, wherein the second road is parallel to the first road or intersects with the first road.

4. A map creating method comprising:
a step of acquiring positional information of a vehicle by means of a GPS, a gyro, or a vehicle speed sensor;
a step of creating trajectory data of the vehicle travelling in a predetermined area on a first road on a basis of the positional information of the vehicle;
the first road being a toll-free road where the vehicle travelling is not charged for a fee or a toll road where the vehicle travelling is charged for a fee,
a second road being a toll road where the vehicle travelling is charged for a higher fee than the first road,
a step of extracting created plural pieces of the trajectory data for the first road, and representative points of the first road located on a side of the second road;
a step of creating road data for the first road on map data by connecting the plural representative points of the first road or by finding an approximate line of the plural representative points of the first road, the plural representative points being extracted for respective plural predetermined areas; and
a step of checking the road data newly created by the road data creation unit by comparison with the road data already existing, and replacing the existing road data with the newly created road data if updating is determined to be required.

5. The map creation system according to claim 1, wherein the trajectory data creation unit creates the trajectory data of the vehicle travelling in a predetermined area on the second road on a basis of the positional information of the vehicle,
the representative point extraction unit extracts plural pieces of the trajectory data for the second road created by the trajectory data creation unit, and the representative points of the second road located on a side of the first road different from the second road, and the road data creation unit creates the road data for the second road on map data by connecting the plural representative points of the second road or by finding an approximate line of the plural representative points of the second road, the plural representative points being extracted by the representative point extraction unit for respective plural predetermined areas.

6. The map creation system according to claim 5, wherein the representative point extraction unit extracts the representative points on a basis of a frequency distribution of the plural pieces of trajectory data in the predetermined area.

7. The map creation system according to claim 2, wherein
if the frequency distribution of plural pieces of the trajectory data for the first road and the frequency distribution of plural pieces of the trajectory data for the second road overlap each other, the representative point extraction unit extracts the representative point of the first road located closest to the side of the second road, the road data creation unit creates the road data for the first road on map data by connecting the plural representative points of the first road or by finding an approximate line of the plural representative points of the first road, the plural representative points being extracted by the representative point extraction unit for respective plural predetermined areas, and the representative point extraction unit extracts the representative points of the second road located on a side of the road data for the first road.

8. The map creation system according to claim 5, wherein the second road is parallel to the first road or intersects with the first road.

* * * * *